May 8, 1956　　　C. SAUNDERS　　　2,744,633
FILTERS
Filed Oct. 2, 1951　　　3 Sheets-Sheet 1
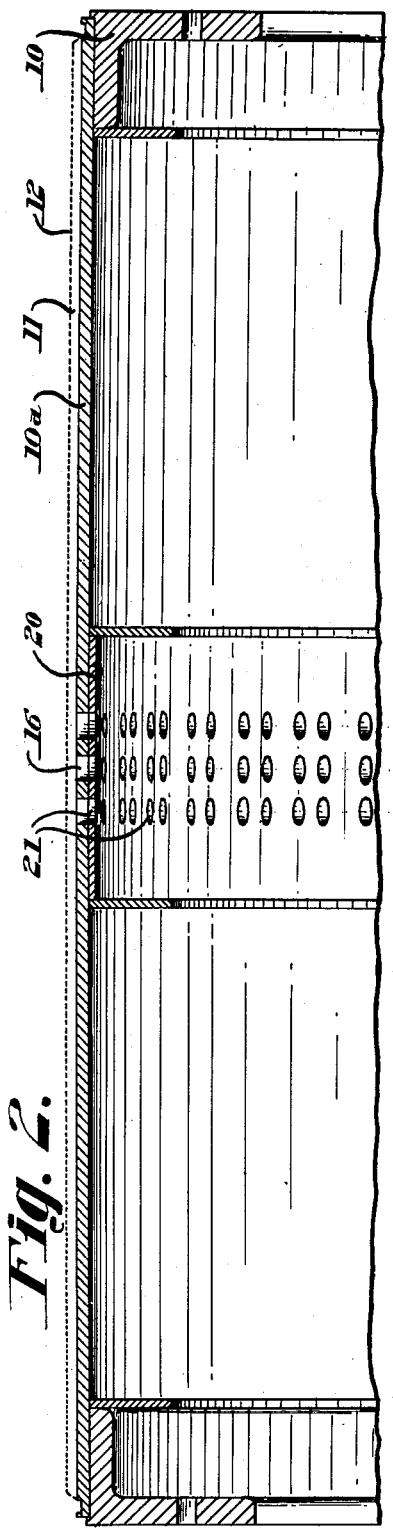
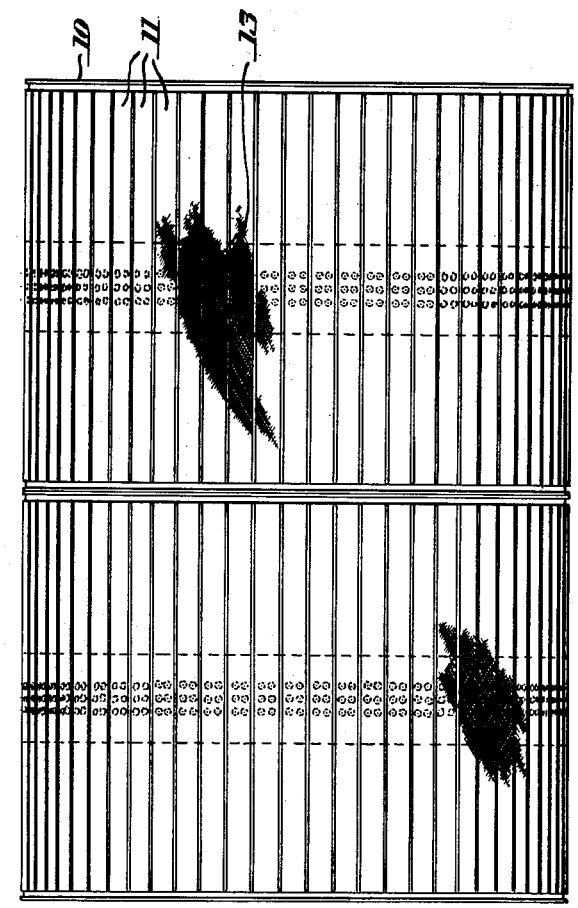
INVENTOR
CLAUDE SAUNDERS

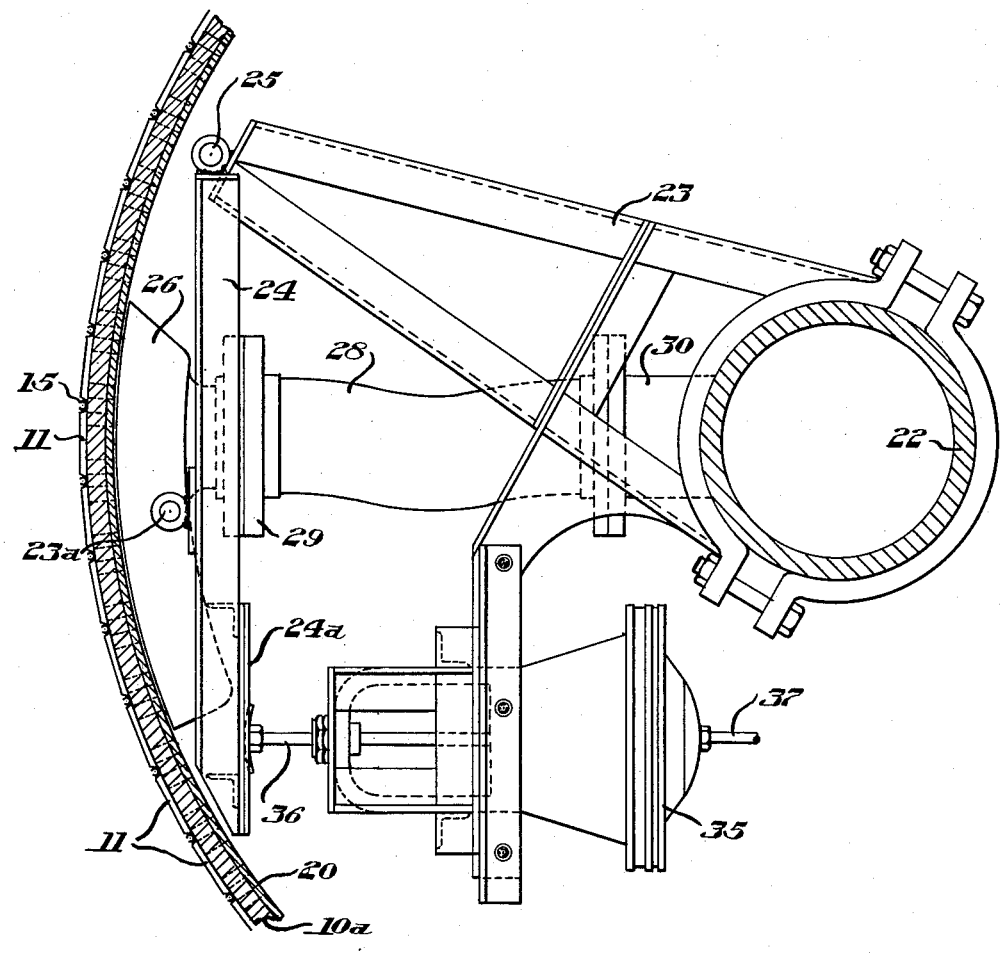

May 8, 1956  C. SAUNDERS  2,744,633
FILTERS

Filed Oct. 2, 1951  3 Sheets-Sheet 3

INVENTOR
CLAUDE SAUNDERS

United States Patent Office 2,744,633
Patented May 8, 1956

2,744,633

FILTERS

Claude Saunders, Dry Branch, Ga., assignor to Georgia Kaolin Company, Elizabeth, N. J., a corporation of New Jersey Application October 2, 1951, Serial No. 249,360

8 Claims. (Cl. 210—199)

This invention relates to filters and particularly to continuous filters and comprises a number of features of improvement in the continuous filtering of materials suspended in liquids.

Continuous filters of one form or another are well known in the art. A commonly used form consists generally of a filter drum rotatable in a material to be filtered. The outer periphery of the filter drum is formed of a perforated member which is adapted to pick up solids from the material to be filtered and to discharge these solids at a point spaced from the pickup. Generally the inner side of the perforated member is maintained at a sub-atmospheric pressure so that the liquid from the material to be filtered tends to be forced through the perforated member leaving a cake of solid material on the perforated member. The solid material which remains on the surface of the drum after the removal of the liquids must be continuously and substantially completely removed from the perforated member. It is also desirable that the cake which is removed be and remain free from added moisture. So long as the perforated member is under a differential pressure from the outside of the member to the inside it is difficult to remove all of the filter cake. Various expedients have accordingly been proposed for expediting the removal of filter cake. For example, doctor blades extending across the face of the drum have been used to strip the cake from the filter drum, strings extending across the drum surface have been used to separate the cake from the drum and in several forms of filters the removal of the cake is expedited by sealing off a portion of the interior of the perforated member from the sub-atmospheric pressure in the interior of the drum.

The expedients which have been proposed for the removal of filter cake from continuous filters of the rotary drum type are, however, not entirely satisfactory for one or more reasons. For example, in one type, it has been the general practice to use a sealing shoe which extends across the entire length of the drum interior and encloses all of the perforations within a fixed arcuate section of the drum as it passes the point where the filter cake is to be discharged. This practice requires that the entire internal drum surface be accurately machined and, where corrosive liquids are to be filtered, that it be made of corrosion-resistant materials. If the machined surface is scored, the seal is lost and it is necessary to replace the entire filter drum or remachine the entire internal surface of the drum in order to regain the seal. It is apparent that the amount of machining that can be done on the interior of a drum is limited and that any loss either through replacement or remachining, particularly where corrosion-resistant materials such as stainless steel are involved is not only time consuming but costly in materials and labor.

It has also been the practice in some types of filters to use a "blowback" through a portion of the openings in the drum surface at the point of filter cake discharge, i. e., to impose a positive pressure greater than atmospheric pressure on a portion of the interior of the drum and through the corresponding perforations in the drum surface. This practice, on conventional rotary filters, with which it is used, tends to trap water in the perforated member and blow it into the filter cake during its removal from the drum. The resulting filter cake contains an excessive amount of moisture and, in the case of clay, its removal is complicated by the higher moisture content and an increased tendency to flow.

I provide a continuous filter which overcomes many of the disadvantages of the prior art filters. My filter comprises a transverse hollow bearing supporting member, a filter drum concentric therewith and rotatable thereon and a plurality of side-by-side filter cells disposed on the outer peripheral surface of the filter drum parallel to the axis of rotation of the drum and having a leading and trailing edge substantially transverse to the path of rotation of the drum. Means are provided for delivering to the drum a material to be filtered. In the drum I provide at least one passage through the drum surface into each filter cell adjacent each of the leading and trailing edges thereof and communicating between each filter cell and the interior of the drum. A slidable shoe sealing the passages between at least one filter cell and the drum interior at all times is provided. This shoe is articulated on the hollow bearing supporting member and pressure means is provided to act upon the shoe for maintaining a substantially uniform sealing pressure between the shoe and the passages.

In order to obviate the need for machining the entire internal face of the drum and to prevent wear on the drum itself I preferably provide a removable wear plate on the drum interior which covers the passages. Passages are provided in the wear plate which correspond to the passages in the drum surface and form therewith means for communicating between the interior of the drum and the filter cells.

Preferably a hanger member is fastened to the bearing supporting member and extends radially outwardly therefrom to a point adjacent the wear plate. The sliding shoe is rotatably mounted or articulated on the end of this hanger means so that its position relative to the wear plate can be adjusted. In order to control the adjustment of the shoe relative to the wear plate I preferably provide one or more hanger arms depending from and rotatable on the end of the hanger means and having means intermediate their ends upon which the shoe itself is rotatably mounted. A pressure diaphragm connected to the hanger means and bearing against a bearing plate on the hanger arm exerts pressure on the shoe whereby to cause it to rotate about its point of suspension on the hanger means and maintain a substantially constant sealing pressure between the wear plate and all parts of the shoe in contact therewith.

A sealing member is provided about the outer edge of the shoe to contact the wear plate and to seal the portion of the wear plate covered by the shoe from the interior of the filter drum. This sealing member may be made of any suitable material such as rubber or asbestos impregnated with graphite. The sealing member is preferably adjustable with respect to the shoe so that its position with respect to the shoe and the wear plate can be varied. The shoe is preferably provided with a passage sufficiently large to cover all of the openings into a single filter cell at all times. The passage is connected by a resilient conduit to a conduit extending through the hollow bearing supporting member so that a differential pressure may be imposed within the passage in the shoe. Means are provided in the hollow bearing supporting member for removing the filtrate which collects within the drum interior. Means are also provided in the hollow bearing supporting member for maintaining the interior of the drum under a sub-atmospheric pressure.

I have not attempted to set forth all of the details of my invention but simply to draw attention to salient features and outline the advantages thereof. Other details, objects and advantages of the invention will become apparent from the following description of a presently preferred embodiment thereof.

In the accompanying drawings I have shown a present preferred form of apparatus embodying the features of my invention in which, Figure 1 is a side elevation of a continuous filter incorporating the features of my invention;

Figure 2 is a partial longitudinal section of a filter drum embodying the features of my invention;

Figure 3 is a partial transverse section of a filter drum according to my invention showing in elevation the means of suspending and operating the filter shoe;

Figure 5:
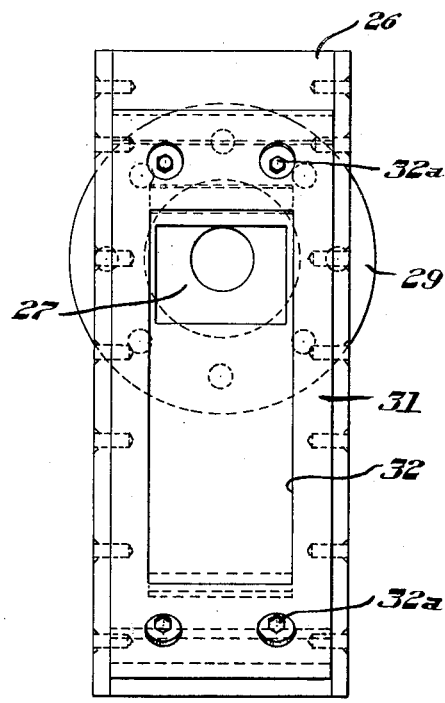
Figure 5 is a front elevation of the shoe shown in Figure 4.
Figure 4:
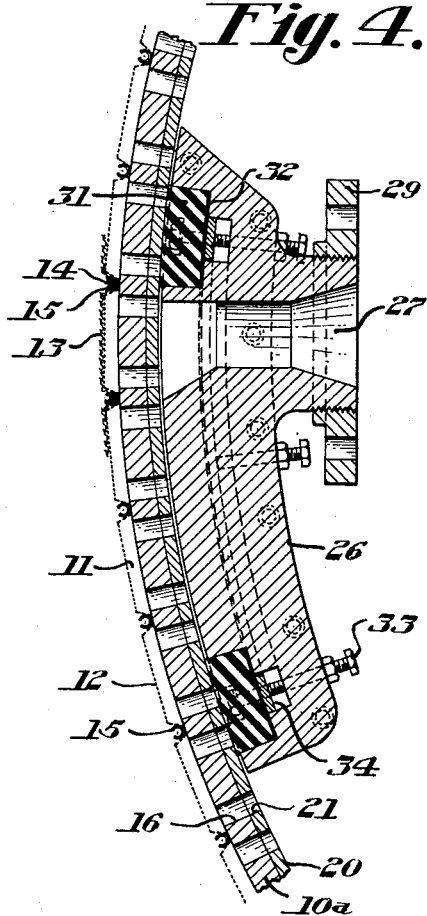
Figure 4 is a vertical section through a shoe for use in my invention.

Referring to the drawings, there is illustrated a filter drum 10 having a plurality of side-by-side filter cells 11 disposed on the outer peripheral surface of the drum. These filter cells are made up of a channel member 12 having a perforated surface. A filter medium (such as filter cloth) 13 is placed over the perforated channel member and is held in place thereon by a rod 14 which extends longitudinally across the drum surface between adjacent perforated channel members 12 in a semi-circular slotted member 15 which embraces and holds both the filter medium and the rod. As the drum is rotated through a material to be filtered the filter cake builds up on the outside of the filter medium 13.

A series of holes or passages 16 are provided through the drum wall 10a at both the leading edge and the trailing edge of each filter cell. These passages communicate between the interior of the filter cell and the drum interior. A wear plate 20 is bolted or otherwise removably attached to the interior of the filter drum over the openings 16. A series of openings 21 is provided in this wear plate corresponding to the openings 16 in the drum surface. These openings 21 along with openings 16 in the filter drum communicate between the interior of the filter cell and the interior of the filter drum. The openings 16 and the wear plate 20 with its openings 21 are placed substantially in the center of the filter drum spaced from the ends of the drum and extend over a distance substantially less than the effective length of the filter cells 11.

A hollow bearing supporting member 22 extends through the axis of the filter drum and the drum is journaled thereon and rotatable thereon. The manner of journaling the filter drum on the bearing member is old and well known and is not illustrated in the drawings. The hollow bearing supporting member carries means for removing the filtrate from the interior of the drum as well as means for impressing a sub-atmospheric pressure on the drum interior. The means for accomplishing both of these purposes is old and well known in the art and it is not deemed necessary to illustrate and describe their structure and operation here.

A radially extending hanger member 23 is provided on the hollow bearing member 22. This hanger member extends radially outwardly from the bearing supporting member to a point adjacent the wear plate. A pair of supporting arms 24 depend from a shaft 25 mounted on the end of the hanger member. These arms are rotatable about the shaft 25 and the end of the hanger member 23. A sliding shoe 26 is journaled for rotation about a shaft 23a which extends between the arms 24 intermediate their ends. The face of the shoe 26 is formed in arcuate section to follow the contour of the wear plate 20. A sealing member 31 is removably mounted in a recess 32 in the face of the shoe 26.

The sealing member 31 is mounted on a backup plate 34 to which it is held by screws 32a. Adjusting screws 33 pass through the shoe 26 and bear against the backup plate 34 to move the sealing member 31 in and out of the recess 32 in the shoe. The sealing member 31 bears against the wear plate 20 and effects a seal between the shoe and the wear plate, sealing the passages covered by the shoe from the interior of the drum.

A passage 27 is provided through the shoe and is of a size sufficient to embrace all of the openings between at least one filter cell and the drum interior. A flexible conduit 28 is connected to the shoe by flange connections 29. This flexible conduit forms with the passage 27 in the shoe a continuous passage from the interior of the shoe to a conduit 30 in the hollow bearing supporting member 22. The conduit 30 passes out of the interior of the drum through the hollow bearing supporting member where it may be open to the atmosphere or have a positive pressure applied through it to the interior of the shoe. In this fashion the passage 27 through the interior of the shoe and the particular filter cell or cells whose openings are covered thereby may have a pressure differential impressed thereon with respect to the pressure of the interior of the drum or with respect to both the pressures of the interior of the drum and the exterior of the drum. A pressure actuator 35 which may conveniently be of the diaphragm type is mounted on the hanger member 23 and operatively connected to the ends of the arms 24 through the shaft 36. Preferably the end of the shaft 36 bears against a bearing plate 24a on the arms 24 and thereby acts upon the shoe 26. A pressure fluid line 37 is connected to the actuator whereby fluid may be introduced into the diaphragm under pressure to actuate the shaft 36 and thereby move the arms 24 about the shaft 25 and the shoe 26 toward or away from the wear plate 20. In this way the shoe 26 is permitted to adjust itself to irregularities in the drum interior and to maintain a substantially constant sealing pressure between the wear plate and all parts of the shoe which contact it.

As the filter drum rotates through a medium to be filtered, liquid is drawn through the filter medium 13 and perforated channel 12 into the interior of the filter cell 11. The liquid passes axially along the filter cell to the openings 16 and 21 through which it passes into the interior of the drum. The solid material from which the liquid has been removed remains on the outer surface of the filter medium 13. A filter cake is thus built up on the exterior of the rotating filter drum as it passes through the medium to be filtered. When a filter cell 11 leave the medium to be filtered, the sub-atmospheric pressure within the interior of the drum continues to act upon it to remove a substantial portion of whatever remaining water is trapped in the deposit of solid material on the filter medium. The leading and trailing openings 16 in the filter cell permit free drainage of the cell in all positions about its arcuate path and prevent the trapping of water in the cells when they reach the sealing shoe.

When any particular filter cell reaches the point of cake discharge the sealing shoe 26 covers the passages 16 and 21 in the wear plate and drum surface thereby sealing that cell from the sub-atmospheric pressure of the drum interior. The filter cell is then either opened to atmospheric pressure through the passage 27 and the conduits 28 and 30 or a positive pressure greater than atmospheric is applied through the same means to release the filter cake from the filter medium 13 and make its removal less difficult.

A substantially constant pressure is applied to the diaphragm of the actuator 35 which in turn causes the shoe 26 to follow any irregularities in the wear plate at a substantially constant pressure without breaking the seal around the portion of the wear plate covered by the shoe.

While I have illustrated and described a presently preferred embodiment of the invention, it is to be understood that the invention is not limited thereto but may be otherwise variously embodied within the scope of the following claims.

I claim:

1. A continuous filter comprising a transverse hollow bearing supporting member, a filter drum concentric therewith and rotatable thereon, a plurality of side-by-side filter cells disposed on the outer peripheral surface of the filter drum parallel to the axis of rotation of the drum and having leading and trailing edges substantially transverse to the path of rotation of the drum, means for delivering to the drum exterior a material to be filtered, at least one passage through the drum surface into each filter cell adjacent each of the leading and trailing edges thereof and communicating between each filter cell and the interior of the drum, a removable wear plate on the drum interior covering said passages, passages in the wear plate corresponding to the passages in the drum surface and forming therewith means for communicating between the interior of the drum and the filter cell, hanger means on the bearing supporting member extending radially outwardly therefrom to a point adjacent the wear plate, a slidable shoe suspended from the hanger member for rotation thereon, sealing means on the shoe contacting the wear plate and sealing the passages between at least one filter cell and the drum interior at all times and means exerting pressure on the shoe and maintaining substantially uniform contact between the sealing means and the wear plate.

2. A continuous filter comprising a tranverse hollow bearing supporting member, a filter drum concentric therewith and rotatable thereon, a plurality of side-by-side filter cells disposed on the outer peripheral surface of the filter drum parallel to the axis of rotation of the filter drum and having a leading and trailing edge substantially transverse to the path of rotation of the drum, at least one passage through the drum surface into each filter cell adjacent each of the leading and trailing edges thereof, means for delivering to the drum exterior a material to be filtered, said passages communicating between each filter cell and the interior of the drum, a removable wear plate on the drum interior covering said passages, passages in the wear plate corresponding to the passages in the drum surface and forming therewith means for communicating between the interior of the drum and filter cell, hanger means on the bearing supporting member extending radially outwardly therefrom to a point adjacent the wear plate, a slidable shoe suspended on the end of the hanger means adjacent the wear plate and rotatable thereon, conduit means within the hollow bearing supporting member extending into the interior of the drum, a hollow passage in said shoe covering all of the passages between at least one filter cell and the drum interior, resilient conduit means connecting the conduit means within the hollow bearing to the passage in the shoe, resilient sealing means on the shoe surrounding the passage therein and sealing the passages of at least one filter cell from the interior of the drum at all times and means exerting a constant pressure on the shoe and maintaining substantially uniform contact between the shoe and wear plate.

3. A continuous filter comprising a transverse hollow bearing supporting member, a filter drum concentric therewith and rotatable thereon, a plurality of side-by-side filter cells disposed on the outer peripheral surface of the filter drum parallel to the axis of rotation of the filter drum and having a leading and trailing edge substantially transverse to the path of rotation of the drum, means for delivering to the drum exterior a material to be filtered, at least one passage through the drum surface into each filter cell adjacent each of the leading and trailing edges thereof, said passages communicating between each filter cell and the interior of the drum, a removable wear plate on the drum interior covering said passages, passages in the wear plate corresponding to the passages in the drum surface and forming therewith means for communicating between the interior of the drum and filter cell, means for communicating between the interior of the drum and filter cell, hanger means on the hollow bearing supporting member extending radially outwardly therefrom to a point adjacent the wear plate, a slidable shoe rotatably suspended from the outer end of said hanger, said shoe covering the passages between at least one filter cell and the drum interior at all times, sealing means on said shoe contacting the wear plate and adjusting means on the shoe for positioning the sealing means with respect to the shoe and means exerting pressure on the shoe and maintaining a substantially uniform contact between the sealing means and the wear plate.

4. A continuous filter comprising a transverse hollow bearing supporting member, a filter drum concentric therewith and rotatable thereon, a plurality of side-by-side filter cells disposed on the outer peripheral surface of the filter drum parallel to the axis of rotation of the drum and having a leading and trailing edge substantially transverse to the path of rotation of the drum, means for delivering to the drum exterior a material to be filtered, at least one passage through the drum surface into each filter cell adjacent each of the leading and trailing edges thereof, said passages being adjacent the center of the drum surface and communicating between each filter cell and the interior of the drum, a removable wear plate on the drum interior covering said passages, passages in the wear plate corresponding to the passages in the drum surface and forming therewith means for communicating between the interior of the drum and the filter cell, a slidable shoe in contact with said wear plate and sealing the passages between at least one filter cell and the drum interior at all times to effect a pressure differential between said at least one filter cell and the interior of the drum, said shoe being articulated on the hollow bearing supporting member and means exerting pressure on the shoe and maintaining substantially uniform contact between the shoe and the wear plate.

5. A continuous filter comprising a transverse hollow bearing supporting member, a filter drum concentric therewith and rotatable thereon, a plurality of side-by-side filter cells disposed on the outer peripheral surface of the filter drum parallel to the axis of rotation of the drum and having a leading and trailing edge substantially transverse to the path of rotation of the drum, means for delivering to the drum exterior a material to be filtered, a plurality of passages into each filter cell adjacent each of the leading and trailing edges thereof through the drum surface adjacent the center thereof communicating between the interior of the drum and the interior of each filter cell, a removable wear plate on the drum interior covering said passages, passages in the wear plate corresponding to the passages in the drum surface and forming therewith means for communicating between the interior of the drum and the filter cell, a slidable shoe in contact with said wear plate and sealing the passages between at least one filter cell and the drum interior at all times to effect a pressure differential between said at least one filter cell and the interior of the drum, said shoe being articulated on the hollow bearing supporting member and means exerting constant pressure on the shoe and maintaining substantially uniform contact between the shoe and the wear plate.

6. A continuous filter comprising a transverse hollow bearing supporting member, a filter drum concentric therewith and rotatable thereon, a plurality of side-by-side filter cells disposed on the outer peripheral surface of the filter drum parallel to the hollow bearing supporting member and extending across the surface of the drum to form a leading and a trailing edge substantially transverse to the path of rotation of the drum, means for delivering to the drum exterior a material to be filtered, at least one passage through the drum surface communicating between the interior of the drum and the interior of the filter cell adjacent the leading edge of said filter cell, at least one passage through the drum surface communicating between the interior of the drum and the interior of the filter cell adjacent the trailing edge of said cell, a removable wear plate on the internal drum surface, said wear plate having passages therein corresponding to the passages in the drum surface and forming therewith a passage from the interior of the filter cell to the interior of the drum, a slidable shoe in contact with said wear plate, said shoe sealing at least one of said leading and trailing passages at all times from the interior of the drum to effect a pressure differential between said at least one filter cell and the interior of the drum, hanger means on the bearing supporting member extending radially outwardly therefrom to a point adjacent the shoe, an articulated connection between said hanger and the shoe, and means exerting pressure on the shoe and sensitive to variation in the wear plate surface varying the position of said shoe to maintain its relative position with respect to the wear plate.

7. A continuous filter comprising a transverse hollow bearing supporting member, a filter drum concentric therewith and rotatable thereon, a plurality of side-by-side filter cells disposed on the outer peripheral surface of the filter drum parallel to the hollow bearing supporting member and extending across the surface of the drum so as to form a leading and trailing edge, means for delivering to the drum exterior a material to be filtered, at least one passage through the drum surface adjacent the center thereof communicating between the interior of the drum and the leading edge of each filter cell, at least one passage through the drum surface adjacent the center thereof communicating between the interior of the drum and the trailing edge of each filter cell, a removable wear plate on the drum interior covering said passages, said wear plate having a width substantially less than the effective length of the filter cells, passages in the wear plate corresponding to the passages in the drum surface and forming therewith means for communicating between the interior of the drum and the filter cell, a slidable shoe in contact with said wear plate, said shoe sealing at least one set of leading and trailing passages at all times from the interior of the drum to effect a pressure differential between said at least one filter cell and the interior of the drum, hanger means on the bearing supporting member extending radially outwardly therefrom to a point adjacent the shoe, an articulated connection between said hanger and the shoe and means exerting pressure on the shoe and sensitive to variation in the surface of the wear plate varying the position of said shoe to maintain its relative position with respect to the wear plate.

8. A continuous filter comprising a transverse hollow bearing supporting member, a filter drum concentric therewith and rotatable thereon, a plurality of side-by-side filter cells disposed on the outer peripheral surface of the filter drum parallel to the axis of rotation of the drum and extending across the surface of the drum to form a leading and trailing edge, means for delivering to the drum exterior a material to be filtered, a plurality of passages through the drum surface adjacent the center thereof communicating between the interior of the drum and the leading edge of each filter cell, a plurality of corresponding passages substantially parallel to the first passages through the drum surface communicating between the interior of the drum and the trailing edge of each filter cell, said passages extending over substantially less than the effective length of the filter cells, a removable wear plate on the drum interior covering said passages, said wear plate having a width substantially less than the effective length of the filter cells, passages in the wear plate corresponding to the passages in the drum surface and forming therewith means for communicating between the interior of the drum and the filter cell, a slidable shoe in contact with said wear plate, said shoe sealing at least one set of leading and trailing passages at all times from the interior of the drum to effect a pressure differential between said at least one filter cell and the interior of the drum, hanger means on the bearing supporting member extending radially outwardly therefrom to a point adjacent the shoe, an articulated connection between said hanger and the shoe and means exerting pressure on the shoe varying the position of the shoe to maintain its relative position with respect to the wear plate.

References Cited in the file of this patent

UNITED STATES PATENTS

| 1,377,765 | Elling | May 10, 1921 |
| 2,204,928 | Culver | June 18, 1940 |
| 2,263,852 | Oliver et al. | Nov. 25, 1941 |
| 2,534,563 | Vitalius et al. | Dec. 19, 1950 |
| 2,560,581 | Leffler | July 17, 1951 |
| 2,561,282 | Leffler | July 17, 1951 |
| 2,567,266 | Young | Sept. 11, 1951 |

FOREIGN PATENTS

| 379,592 | Great Britain | Sept. 1, 1932 |